3,356,632
VINYL POLYMERS MODIFIED WITH FLUOROESTERS

William A. Zisman, Silver Spring, Md., Neldon Lynn Jarvis, Fairfax County, Va., and Robert B. Fox, Bethesda, Md., assignors to the United States of America as represented by the Secretary of the Navy
No Drawing. Filed Sept. 9, 1964, Ser. No. 395,338
3 Claims. (Cl. 260—31.6)

The invention described herein may be manufactured and used by or for the Government of the United States of America for governmental purposes without the payment of any royalties thereon or therefor.

This invention relates to the modification of solid, water-insoluble vinyl polymers to provide new polymer compositions of lower surface energy.

In general, lowering of the surface energy of a solid will decrease the wettability and specific adhesion and lower the coefficient of sliding friction of the solid. This effect in strong high polymers such as solid, water-insoluble, vinyl polymers would measurably enhance the practical application of the polymers and in some instances also facilitate the handling, and packaging of the polymers in the form of films and filaments.

The wettability and specific adhesion and coefficient of sliding friction of solid polymers are strongly dependent upon the chemical constitution of the surface layer of the polymer. In order, therefore, to modify these surface properties, it is necessary to alter the chemical composition of the surface of the polymer. Desirably, this alteration should be accomplished without proportionately decreasing the bulk strength properties of the polymer.

It is an object of the present invention to provide solid, water-insoluble, vinyl polymers which are modified to have lower surface energy and in particular a lower wettability, specific adhesion and coefficient of sliding friction without proportionate decrease in the bulk strength properties of the polymers. It is also an object to provide surface-modified, water-insoluble, vinyl polymers of the aforesaid kind which are capable of self-healing to replace surface-active molecules lost from the surface layer of lower energy.

Solid, water-insoluble, vinyl polymers with which the present invention is concerned are polyvinyl chloride, polyvinylidene chloride, copolymers of vinylidene chloride and vinyl chloride in all proportions, copolymers of vinylidene chloride and acrylonitrile in proportions in which the vinylidene chloride is at least 70% by weight, and polymethylmethacrylate.

The above and other objects are accomplished following our invention by the modification of the aforementioned solid, water-insoluble, vinyl polymers through the incorporation therein of a small amount of an additive which is partially fluorinated compound hereinafter more fully described.

Partially fluorinated compounds which are useful as additives for the modification of vinyl polymers in accordance with the invention are those which have surface-activity in an organic medium, and additionally, are soluble or dispersible in the vinyl polymer and capable of diffusion in the bulk polymer phase to adsorb at the polymer/air interface. Partially fluorinated compounds which meet the above qualifications are the fluoroesters listed in Table 1 below.

TABLE 1

Code: Surface-active additive
- A  Bis (1H,1H-pentadecafluorooctyl) tetrachlorophthalate.
- B  Bis (1H,1H-pentadecafluorooctyl) n-octylsuccinate.
- C  Tris (1H,1H-pentadecafluorooctyl) tricarballylate.
- D  Bis (1H,1H-pentadecafluorooctyl) 4-chlorophthalate.
- E  3-(hydroxymethyl) 1-,5-pentanediol tris (heptafluorobutyrate).

The fluoroesters of the above group when adsorbed at the polymer/air interface, are so oriented that the fluorocarbon tail of the additive ester remains in the surface or may even stand away from the polymer to provide a high proportion of —$CF_2$— groups which, as has been known, have low wettability with respect to polar and nonpolar liquids, e.g., water and oil, low specific adhesion and a low coefficient of friction, all of which values are lower than those of the vinyl polymers.

The effectiveness of the individual fluoroesters of the above group to function as modifiers of the vinyl polymers in accordance with the invention will vary and depend upon the organophilic-organophobic balance of the individual fluoroester with respect to the host polymer. The extent to which surface-active fluoroesters of the above group will adsorb at the polymer surface is determined by essentially the same properties that are responsible for their effectiveness in organic liquids, namely, the concentration, ability to lower the surface energy of the system, fluorine content, and their solubility or extent of association with the host polymer. By analogy with aqueous or organic liquid systems, the combination of these properties in the fluoroester molecule is called its organophilic-organophobic balance.

The rate at which the individual surface-active partially fluorinated compounds will adsorb at the polymer/air interface is primarily determined by the rate of diffusion in the bulk polymer phase. Added to a melt of the vinyl polymer or to a solution of the polymer in a volatile solvent, the surface-active additive will diffuse sufficiently rapidly to adsorb at the surface as the polymer solidifies or as the solvent evaporates. The rate of adsorption will necessarily be much slower if the surface-active molecules do not have sufficient time to reach adsorption equilibrium at the polymer surface while the polymer is in the fluid state. Once the polymer is solid it may take hours or days for a significant amount of the additive to migrate to the surface, depending upon the concentration of the additive and the particular polymer. The rate of migration in the solid polymer can be accelerated by heating the polymer, for example, to a temperature of about 50° C.

The surface-active fluoresters of the above group may be incorporated in the vinyl polymers by adding them to the polymers in the molten state or in solution in a volatile solvent or to the vinyl monomers before polymerization. They are effective in small amounts, in which may be from about 0.05% up to 4% by weight on the polymer. Larger amounts of the fluoroester additives may be used if desired, for example, 6% by weight, but are without compensation in terms of producing a surface of still lower energy on the polymers.

Wetting and friction tests were conducted on vinyl polymers in which had been incorporated a small amount of a fluoroester additive of the above group. The results of these tests, which are set forth in the tables below, demonstrate the capacity of the surface-active additives of the above group to modify the vinyl polymers whereby they are provided with a surface of lower energy and, in consequence, of lower wettability, specific adhesion and coefficient of sliding friction.

The wetting and friction tests were conducted on films of the vinyl polymer containing the fluoroester additive and on pressed disks of the mixed powdered vinyl polymer and fluoroester additive.

The test films were approximately 15 microns thick and deposited from a solution in a volatile solvent of the vinyl polymer and fluoroester additive onto the flat bottom of shallow rectangular 1½" x 3" (Pyrex) glass dishes. The dishes were filled with the solution to a depth of about ¾" and allowed to stand at room temperature for 24 hours under conditions of slow evaporation of the solvent. The dishes were covered under a glass hood which was lifted slightly on one side for escape of the solvent. Traces of the solvent were removed from the air-dried films of the vinyl polymer and fluoroester additives by vacuum evaporation at room temperature over a period of 16 hours. The dried films were stored in an evacuated dessicator while awaiting test. Like films of the unmodified vinyl polymers were prepared in the same manner.

The test disks, measuring one inch in diameter and weighing several grams, were prepared by heat and pressure molding of thoroughly mixed powders of the vinyl polymer and the fluoroester additive in a stainless steel mold provided with a highly polished facing surface (Carver press). The pressure was maintained for several hours until smooth polymer surfaces were obtained. Like discs of the unmodified vinyl polymers were formed in the same manner.

The wetting tests were conducted by touching drops of the test liquid to the surface of the modified and unmodified polymer films and disks (polished surface) by means of a fine diameter (about 1 mm.) platinum wire. Contact angles on each polymer surface for the various liquids were determined while increasing the volume of the drop, and thus slowly advancing its periphery over the surface. The contact angles on the polymer films were measured using the method and improved goniometer telescope described by Fox and Zisman, J. Colloid Science 5, 514 (1950). The contact angles on the polymer films were measured through the plane ends of the rectangular dishes containing the films. All contact angles were measured in air and at 25°±1° C. with the relative humidity varying from about 15 to 30 percent.

Friction measurements were made with steel sliding on the modified or unmodified polymer films and disks using a modified "stick-slip" machine which is essentially the same as that designed by Goodzeit, Hunnicutt and Roach, Trans. A.S.M.E. 78, 1669 (1956). The opposed surfaces in the machine were a one-half inch diameter ball of 52100 steel which was locked in a chuck fastened to the friction arm and either the disc or the film on the flat glass disk substrate clamped to the sliding steel table. The normal force, or load, was applied to the steel ball by means of a cam which depressed the friction arm and pressed together the steel ball and polymer specimen. Relative motion between the steel ball and the polymer sample was produced by a "Air-Draulic" cylinder which slowly and smoothly pushed the sliding table along a pair of parallel tracks. Two pairs of electrical wire strain gauges, cemented on the friction arm, were used as the force-measuring elements for the load and friction, both of which were recorded simultaneously on a Brush Oscillograph. The static and kinetic coefficients of friction were determined at 25° C. the relative speed of sliding of the specimens was 0.01 cm./sec. and the normal load applied was 1 kg. Hardness was measured with a Vickers 136° diamond pyramid indentor. Tabor, "The Hardness of Metals," Oxford Univ. Press, London (1950). At least three hardness measurements were made in each plastic specimen at a 100 gram load and three at a 500 gram load, with each load having been applied for 15 seconds.

The results of the wetting and friction tests on the polymers modified with the addition of a fluoroester of the above group appears on Tables 2 and 6 below. Vickers Hardness Numbers were obtained on some of the modified polymers and appear in Tables 4, 5, and 6, respectively.

*Vinylidene chloride-acrylonitrile copolymer*

Two films of a copolymer containing 80% by weight vinylidene chloride and 20% acrylonitrile were deposited by slow evaporation as described above from tetrahydrofuran solutions onto flat-bottom rectangular 1½" x 3" Pyrex dishes (Knoop-Hardness 480). The one film contained 1% by weight of fluoroester additive A and the other, the control, contained no additive. Each film was approximately 15 microns thick.

TABLE 2

| Additive | Contact Angles, degrees | | | Coefficient of Friction | |
|---|---|---|---|---|---|
| | Water | Methylene Iodide | Hexadecane | Static | Kinetic |
| None | 81 | 32 | 0 | 0.80 | 0.65 |
| 1 wt. percent A | 101 | 51 | 43 | 0.10 | 0.08 |

The results show that a 1 weight percent concentration of additive A lowered the static and kinetic friction by nearly an order of magnitude to make a good boundary lubricant of the dry solid polymer. The much greater contact angles of water, methylene iodide and hexadecane on the polymer film containing additive A reveal the presence of fluorocarbon groups in the polymer surface.

*Polyvinylidene chloride*

Disks of polyvinylidene chloride containing 0, 1% and 2% by weight of fluoroester additive A were formed as described above from thoroughly mixed powders of the polymer and additive in the steel mold with polished facing surface. The disks were formed by molding at 225° F. under a pressure of 10,000 p.s.i. for six hours. The contact angles and the cofficients of friction were measured on the smooth, glossy, freshly-molded surface of each disk.

TABLE 3

| Additive | Contact Angles, degrees | | | Coefficient of Friction | |
|---|---|---|---|---|---|
| | Water | Methylene Iodide | Hexadecane | Static | Kinetic |
| None | 83 | 30 | Spreads | 0.50 | 0.45 |
| 1% A | 104 | 49 | 29 | 0.20 | 0.15 |
| 2% A | 99 | 48 | 28 | 0.22 | 0.15 |

These results show a substantial lowering of the surface energy and coefficients of friction of the modified polymer. Addition of 1 and 2 percent of additive A to the polymer, reduced the very high friction of the polymer (unmodified) by 60 to 66%.

*Vinylidene chloride-vinylchloride copolymer*

Disks of copolymers of 85% by weight vinylidene chloride and 15% by weight vinylchloride were molded from well-mixed powders of the polymer and the fluoroester additives, 1% by weight A and 1.4% by weight D respectively, and the powdered copolymer with no additive. Molding of the disks was done at 160° F. under 10,000 p.s.i. for 4½ hours. The contact angles and the friction measurements were made on the smooth glossy face of the freshly molded disks.

TABLE 4

| Additive | Vickers Hardness Number | Contact Angles, degrees | | | Coefficient of Friction | |
|---|---|---|---|---|---|---|
| | | Water | Methylene Iodide | Hexadecane | Static | Kinetic |
| None | 16.7 | 80 | 31 | 0 | 0.49 | 0.46 |
| 1% A | 14.8 | 111 | 60 | 30 | 0.12 | 0.08 |
| 1.4% D | 17.3 | 90 | 49 | 30 | 0.26 | 0.11 |

The addition of 1% of additive A raised the contact angle for water by about 40% and for methylene iodide by almost 100%. This is a dramatic demonstration that fluorocarbon "tails" of fluoroester additive A lie in the surface of the polymer. While additive D, which differs from additive A by having three less chlorine atoms, was also effective in raising the contact angle of the three liquids and lowering the coefficients of friction. It was not as effective in these respects as additive A.

*Polyvinyl chloride*

Disks of polyvinylchloride containing 0%, 1%, and 2% by weight of fluoroester additive A were prepared in the same manner and under the same conditions as those employed in the preparation of the disks of the vinylidene chloride-vinylchloride copolymer, above.

TABLE 5

| Additive | Vickers Hardness Number | Contact Angles, degrees | | | Coefficient of Friction | |
|---|---|---|---|---|---|---|
| | | Water | Methylene Iodide* | Hexadecane | Static | Kinetic |
| None | 14.3 | 75 | 20 | 0 | 0.50 | 0.42 |
| 1% A | 14.2 | 96 | 29 | 15 | 0.30 | 0.13 |
| 2% A | 14.2 | 98 | 29 | 19 | 0.37 | 0.16 |

*Appears to attack the polyvinylchloride surface.

The fluoroester additive A raised the contact angle and covered the friction to an approximately equal degree for both the 1% and 2% concentrations in the polymer.

*Polymethylmethacrylate*

Disks of polymethylmethacrylate containing respectively, 2% and 4% by weight of the fluoroester additive B and 4% by weight of the fluoroester additive C, and of the polymer not containing an additive were prepared as above described. The discs were molded at 300° F. under a pressure of 10,000 p.s.i. for four hours. Disks free from the additives were clear and transparent, whereas those with the additives were white and translucent, with many small patches of white opaque material included. The disks were prepared from a thorough mixture of the powdered polymer with the liquid additive B and the powdered solid additive C and the polymer powder with no additive.

TABLE 6

| Additive | Vickers Hardness Number | Contact Angles, degrees | | | Coefficient of Friction | |
|---|---|---|---|---|---|---|
| | | Water | Methylene Iodide | Hexadecane | Static | Kinetic |
| None | 25.1 | 78 | 37 | 0 | 0.60 | 0.52 |
| 2% B | 23.3 | 84 | 43 | 21 | 0.34 | 0.16 |
| 4% B | 20.7 | 88 | 46 | 23 | 0.33 | 0.14 |
| 4% C | 22.2 | 92 | 61 | 53 | 0.19 | 0.12 |

As is apparent, addition of either additive B or C greatly reduced the coefficients of friction. Nearly the same reduction in friction was obtained with either 2% or 4% of additive B.

The new polymer compositions of the invention are self-healing, that is, any surface-active molecule lost from the film adsorbed at the polymer surface may be replaced by diffusion of additional surface-active additive to the polymer/air interface. The rate of self-healing is accelerated by heating the polymer. Frictional heat may sometimes be sufficient to maintain a low surface energy film on the polymer. The extent of surface regeneration will depend upon the time and temperature of exposure of the polymer.

The new polymer compositions of lower surface energy have application in the design or development of new plastic bearings or gears, in the reduction of friction and wear between synthetic fibers, and in the development of plastics in sheet form which will not self-adhere excessively when packaged in roll-form for handling and shipment.

While in the above description, reference has been made to certain specific embodiments of the invention, it is intended that such shall be taken by way of illustration and not in limitation except as may be defined in the appended claims.

What is claimed is:

1. A polymer composition comprising:
 a vinyl polymer selected from the group consisting of polyvinylchloride, polyvinylidene chloride, copolymers of vinylidene chloride and vinyl chloride, copolymers of vinylidene chloride and acrylonitrile in proportions in which the vinylidene chloride is at least 70% by weight and polymethylmethacrylate.
 and a fluoroester selected from the group consisting of bis (1H,1H-pentadecafluorooctyl) 4-chlorophthalate, -tetrachlorophthalate and -n-octylsuccinate, tris (1H,1H-pentadecafluorooctyl) tricarballylate and 3-(hydroxymethyl) 1,5-pentanediol tris (heptafluorobutyrate)
 incorporated therein in a small amount sufficient to provide a surface of lower energy thereon.

2. A polymer composition as defined in claim 1, in which the fluoroester incorporated in the vinyl polymer is bis (1H,1H-pentadecafluorooctyl) tetrachlorophthalate.

3. A polymer composition as defined in claim 1, in which the fluoroester incorporated in the vinyl polymer is bis (1H,1H-pentadecafluorooctyl) 4-chlorophthlate.

References Cited

Jarris et al., Journal of Physical Chemistry, vol. 63 (pages 727–734), May 1959 (pages 729–732; relied on), copy available in Scien. Libary.

Weiss P., et al., "Adhesion and Cohesion," Zisman (pages 176–208), 1962, Elsevier Publishing Co., N.Y. TP968 S9 (page 205 last paragraph relied on), copy available in Scientific Library.

Zisman, W. A., Industrial and Engineering Chemistry, vol. 55 (pages 18–38), No. 10, October 1963 (pages 32 and 35 relied on), copy available in Scientific Library.

MORRIS LIEBMAN, *Primary Examiner.*

A. HOLTZ, L. T. JACOBS, *Assistant Examiners.*